United States Patent
Moser et al.

(10) Patent No.: US 7,309,967 B2
(45) Date of Patent: Dec. 18, 2007

(54) MOTOR DRIVE CIRCUITRY WITH REGENERATIVE BRAKING FOR DISK DRIVE

(75) Inventors: Michael A. Moser, San Jose, CA (US); Bryan S. Rowan, San Jose, CA (US); Mantle Yu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 268 days.

(21) Appl. No.: 10/816,588

(22) Filed: Mar. 31, 2004

(65) Prior Publication Data

US 2005/0218846 A1    Oct. 6, 2005

(51) Int. Cl.
H02P 3/14    (2006.01)
H02P 3/18    (2006.01)

(52) U.S. Cl. ..................................... 318/376
(58) Field of Classification Search ............. None
See application file for complete search history.

(56) References Cited

U.S. PATENT DOCUMENTS

| | | | |
|---|---|---|---|
| 4,831,469 A | | 5/1989 | Hanson et al. |
| 5,001,578 A | | 3/1991 | Yamauchi |
| 5,157,560 A | | 10/1992 | Kanda et al. |
| 5,504,402 A | * | 4/1996 | Menegoli ............... 318/377 |
| 5,633,568 A | * | 5/1997 | Dunfield ............... 318/254 |
| 5,729,399 A | * | 3/1998 | Albrecht et al. ............. 360/75 |
| 5,978,179 A | * | 11/1999 | Khuu ................. 360/265.1 |
| 6,094,020 A | * | 7/2000 | Goretzki et al. ............ 318/109 |
| 6,282,046 B1 | | 8/2001 | Houston et al. |
| 6,566,832 B2 | * | 5/2003 | Ataee .......................... 318/560 |
| 6,972,918 B2 | * | 12/2005 | Kokami et al. ................ 360/75 |
| 2004/0080858 A1 | * | 4/2004 | Suzuki ........................ 360/75 |
| 2004/0223251 A1 | * | 11/2004 | Ventura et al. ................ 360/75 |

FOREIGN PATENT DOCUMENTS

| | | | |
|---|---|---|---|
| JP | 04095281 A | * | 3/1992 |
| JP | 2005182878 A | * | 7/2005 |

OTHER PUBLICATIONS

Linear Technology, product brochure for LT 1944, Dual Micropower Step-Up DC/DC Converter, pp. 1-8 (2001).

(Continued)

Primary Examiner—Lincoln Donovan
Assistant Examiner—Erick Glass
(74) Attorney, Agent, or Firm—Townsend and Townsend and Crew LLP; Patrick Duncan (57) ABSTRACT

During normal operation of a hard disk drive, control logic controls a plurality of switching elements to provide electrical power to a spindle motor and head motor of the disk drive from a voltage source coupled to first and second voltage supply nodes (e.g., Vcc and ground), the spindle motor has a set of motor windings to which the electric power is applied to rotate the spindle motor, and the control logic is configured to enter a regenerative braking state during normal operation where the switching elements are controlled to isolate the spindle motor from the first voltage supply node and cause regenerative braking of the spindle motor so that kinetic energy due to rotation of the spindle motor is converted to electrical power that is supplied to the head motor by virtue of inductance of one or more motor windings in the set.

25 Claims, 6 Drawing Sheets

OTHER PUBLICATIONS

SGS-Thompson Microelectronics, product brochure for L6243DS Voice Coil Motor Driver, pp. 1-8 (1998).

Di Guardo et al., SGS-Thompson Microelectronics, Application Note AN1112, Three-Phase Motor Control by using ST52x301, pp. 1-22, (1999).

* cited by examiner

MOTOR DRIVE CIRCUITRY WITH REGENERATIVE BRAKING FOR DISK DRIVE

BACKGROUND OF THE INVENTION

The present invention relates generally to disk drives, and more specifically to techniques for providing power to the motors in a disk drive. Most of the discussion will concentrate on the example of hard disk drives (HHDs).

One problem facing system integrators who design systems consisting of hard disk drives (HDDs) is to design power supplies capable of meeting both peak and average load conditions. In systems containing many HDDs, the differences between these conditions can become quite large, especially when considering that many drives may be simultaneously acting under their peak load conditions. Considerable cost may go into those system supplies in order to maintain reliable operation well beyond the statistical average load. Minimizing the difference between peak and average load currents eases design requirements for such system power supplies.

Additionally, the peak load from the perspective of the mechanics of the HDD involves increased seek duty cycles (more movement from the head actuators while disk rotation is maintained at its normal operating point). Seeking is necessary in order to allow quick, random access to data stored on the magnetic disk(s). A second problem then is the design tradeoff in the electromechanical system that is made to compromise power consumption for improved access time. The industry demands continued performance improvements as well as energy efficiency. Enabling such advances in HDDs allows new products to work in legacy systems without power supply upgrades.

This design tradeoff may relate to a third problem of limited battery life for mobile applications. Improvements in mobile HDD operating efficiency may translate directly to extended battery life for a given application.

SUMMARY OF THE INVENTION

In short, embodiments of the invention provide a regenerative braking mode that is invoked during normal operation. In this context, normal operation means that power to the disk drive is within acceptable limits and that further read and/or write operations are contemplated.

Embodiments of the present invention are typically deployed in the environment of a disk drive and the associated control circuitry for providing power to spindle and head motors where the spindle motor rotates an information-bearing disk, and the head motor moves a read and/or write head across the rotating disk to access different selected concentric tracks on the disk. A voltage source supplies a voltage between first and second voltage nodes, which may be designated Vcc and ground. A selective switching element is disposed between the first voltage supply node and the motors to define a selectively isolated node, referred to as the motor supply node.

According to an aspect of the invention, during normal operation, control logic controls a plurality of switching elements to provide electrical power to a spindle motor and head motor of the disk drive from a voltage source coupled to first and second voltage supply nodes (e.g., Vcc and ground), the spindle motor has a set of motor windings to which the electric power is applied to rotate the spindle motor, and the control logic is configured to enter a regenerative braking state during normal operation where the switching elements are controlled to isolate the spindle motor from the first voltage supply node and cause regenerative braking of the spindle motor so that kinetic energy due to rotation of the spindle motor is converted to electrical power that is supplied to the head motor by virtue of inductance of one or more motor windings in the set.

According to another aspect of the invention, a circuit controls power supplied to a spindle motor and a head motor of a disk drive from a voltage source coupled to first and second voltage supply nodes, during normal operation the circuit provides a conduction path through a switching element to a motor supply node, and includes a spindle motor drive circuit and a head drive motor drive circuit that provide conduction paths from the motor supply node to the second voltage supply node to energize the spindle motor and the head motor. The circuit further includes a control circuit that operates at specified times during normal operation to cause the switching element to prevent current flow between the first voltage supply node and the motor supply node, configure the spindle motor drive circuit to cease driving the spindle motor and allow the spindle motor to supply current to the motor supply node, and configure the head motor drive circuit to energize the head motor with current flowing from the first voltage supply node and current supplied by the spindle motor.

In some embodiments the circuit also includes a boost circuit coupled between the first voltage supply node and the motor supply node, and may further operate at the specified times during normal operation to activate the boost circuit to allow current to flow from the first voltage supply node to the motor supply node According to another aspect of the invention, a circuit for controlling a spindle motor and a head motor of a disk drive comprises: first and second voltage supply nodes; a switching element coupled between the first voltage supply node and a node, referred to as the motor supply node; a spindle motor drive circuit coupled between the motor supply node and the second voltage supply node, the spindle motor drive circuit including nodes for coupling to respective spindle motor connection nodes; a head motor drive circuit coupled between the motor supply node and the second voltage supply node, the head motor drive circuit including nodes for coupling to respective head motor connection nodes; a boost circuit coupled between the first voltage supply node and the motor supply node; and a control circuit coupled to the switching element, the spindle motor drive circuit, the head motor drive circuit, and the boost circuit.

In this aspect, the control circuit is configured with a set of one or more spindle motor drive states wherein: the switching element is set to allow current flow between first voltage supply node and the motor supply node, the spindle motor drive circuit is configured to energize the spindle motor with current flowing between the motor supply node and the second voltage supply node, and the boost circuit is not activated. The control circuit is also configured with a set of one or more regenerative braking states wherein: the switching element is set to prevent current flow between the first voltage supply node and the motor supply node, the spindle motor drive circuit is configured to allow the spindle motor to supply current to the motor supply node, the boost circuit is activated to allow current to flow from the first voltage supply node to the motor supply node, and the head motor drive circuit is configured to energize the head motor with current flowing from the first voltage supply node and current supplied by the spindle motor.

According to another aspect of the invention, during normal operation, control logic controls a plurality of switching elements to provide electrical power to a spindle motor and head motor of the disk drive from a voltage source coupled to first and second voltage supply nodes, the spindle motor has a set of motor windings to which the electric power is applied to rotate the spindle motor, the control logic is implemented in a self-contained HDD system having a battery, and the control logic is configured to enter a regenerative braking state during a power-down sequence where the switching elements are controlled to isolate the spindle motor from the first voltage supply node and cause regenerative braking of the spindle motor so that kinetic energy due to rotation of the spindle motor is converted to electrical power that is supplied to the battery to recharge the battery. In this context, power-down includes normal power-down or where the rotation of the disk is to be brought to a stop, as for example a sleep mode.

According to another aspect of the invention, energy may be extracted from the rotating spindle motor and pumped into the motor supply node by operating the spindle motor as a temporary generator. By appropriate switching of elements (e.g., transistors) in the spindle motor drive circuit to define a regenerative braking mode, inductive transients can be created on the motor windings that cause current to flow through the upper body diodes of the transistors (or transistor channels themselves if they are operated synchronously—the actual method of preference relying primarily on efficiency of conversion and/or achievable voltage (i.e., dropout)) and into the motor supply node, thus temporarily transferring mechanical energy from the spindle into electrical energy for the head motor to utilize.

A further understanding of the nature and advantages of the present invention may be realized by reference to the remaining portions of the specification and the drawings.

DESCRIPTION OF SPECIFIC EMBODIMENTS

The present invention finds particular applicability to the powering of hard disk drives (HDDs) from host power supplies, but can be used in other contexts such as other types of disk drives (e.g., drives with removable media such as CD and DVD drives).

Structure of a Conventional HDD System

Figure 1:
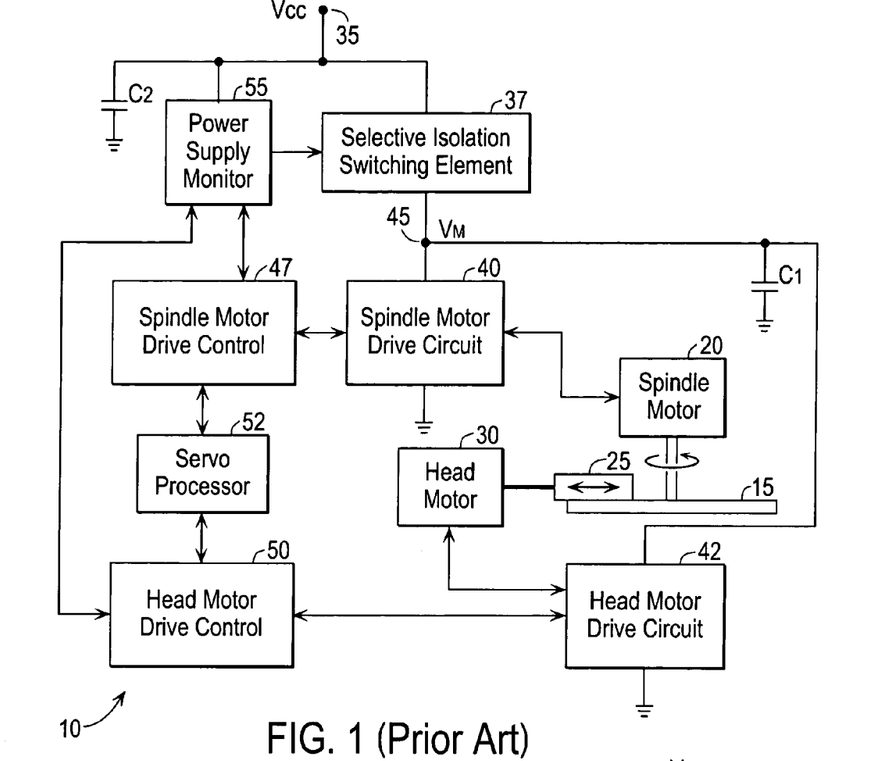
FIG. 1 is a block diagram of a prior art system for powering and controlling a disk drive, which may be a hard disk drive (HDD)

FIG. 1 is a block diagram showing relevant portions of a conventional (i.e., prior art) hard disk drive (HDD) system 10, which may be modified to incorporate one or more embodiments of the present invention. The invention is primarily concerned with controlling and powering the motors, and the figure concentrates on those aspects. As is well known, a hard disk drive mechanism includes one or more disks 15 (also referred to as platters; only one disk is shown) that are rotatably driven by a spindle motor 20. Disk 15 is coated on one or both sides with a magnetic material for storing user data and position information on a plurality of concentric tracks.

Data is written to and read from a given side of disk 15 by a read-write head 25 (referred to simply as head 25) that is driven reciprocally along a radial direction by a head motor 30. (More precisely, head motor 30 typically effects a rotary motion so that head 25 is driven along an arcuate path that is generally radial with respect to the disk). Most modern HDDs (except the very smallest) have a plurality of disks, and therefore have a corresponding plurality of heads (one head per side per disk), which are normally moved in unison. Some HDDs also have multiple heads per side per disk. For simplicity, references to disk 15 and head 25 will be in the singular, it being understood that there may well be multiple disks and heads.

The present invention is drawn to techniques for managing the power applied to spindle motor 20 and head motor 30, and the relevant circuitry for controlling the electric power will be described. As is well known, HDD system 10 is typically included in a larger data processing or storage system, and communicates with a host computer (not shown). Additional conventional elements of the HDD, such as those implementing the data channel and host interface, are also not shown. Further, the HDD system typically receives power (5 volts and/or 12 volts is typical) from a power supply in the host or a power supply in a separate drive enclosure. While the invention can provide benefits to HDDs in many different environments, it can be particularly effective when the source of power is limited (e.g., in mobile systems running off of battery power).

The spindle motor and head motor are illustrated as receiving electrical power from a voltage source coupled between a voltage node 35 (designated Vcc) and ground. A selective isolation switching element 37 is interposed between voltage supply node 35 and respective supply nodes of a spindle motor drive circuit 40 and a head motor drive circuit 42. Motor drives circuits 40 and 42 have respective nodes connected directly or indirectly to ground. Voltage node 35 will sometimes be referred to as the system supply node, or simply as the system supply.

A node 45 between selective isolation switching element 37 and the supply nodes of motor drive circuits 40 and 42 is labeled $V_M$ and is sometimes referred to as the motor supply node. Thus, selective isolation switching element 37 has the capability of selectively isolating spindle motor drive circuit 40 and head motor drive circuit 42 from voltage node 35 (Vcc). The drawing also shows a storage capacitor C1 coupled between $V_M$ and ground and a decoupling (filter) capacitor C2 coupled between Vcc and ground. As will be discussed in greater detail below, spindle motor drive circuit 40 and head motor drive circuit 42 include sets of switching elements that receive control signals from a spindle motor drive control circuit 47 and a head motor drive control circuit 50.

The disk drive's mechanical elements and the spindle and head motors provide feedback signals. Therefore, the communication links between each motor drive control circuit, its respective motor drive circuit, and its respective motor are shown as bi-directional links to indicate that signals are flowing to the motors and that feedback signals are flowing back. Spindle motor drive control circuit 47 and head motor drive control circuit 50 operate in communication with a servo processor 52. The particular manner in which the control signals are generated to drive the head to the correct track and rotate the disk to the correct sector are not part of the invention and will not be described further. As mentioned, the present invention deals with the techniques ensuring proper electrical power to the spindle motor and head motor.

A power supply monitor 55 senses the supply voltage and provides signals to spindle motor drive control circuit 47, head motor drive control circuit 50, and selective isolation switching element 37. Such signals specify whether the system supply voltage (Vcc) is within acceptable limits, in which case one set of operations are permitted, or if the system supply voltage is outside acceptable limits, in which case a different set of operations are permitted, or perhaps mandated. One feature of prior art disk drive power management circuitry is the ability to park disk head 25 safely away from the active regions of disk 15 when power is lost, either due to intended powering down of the disk drive or due to catastrophic power failure.

Figure 2:
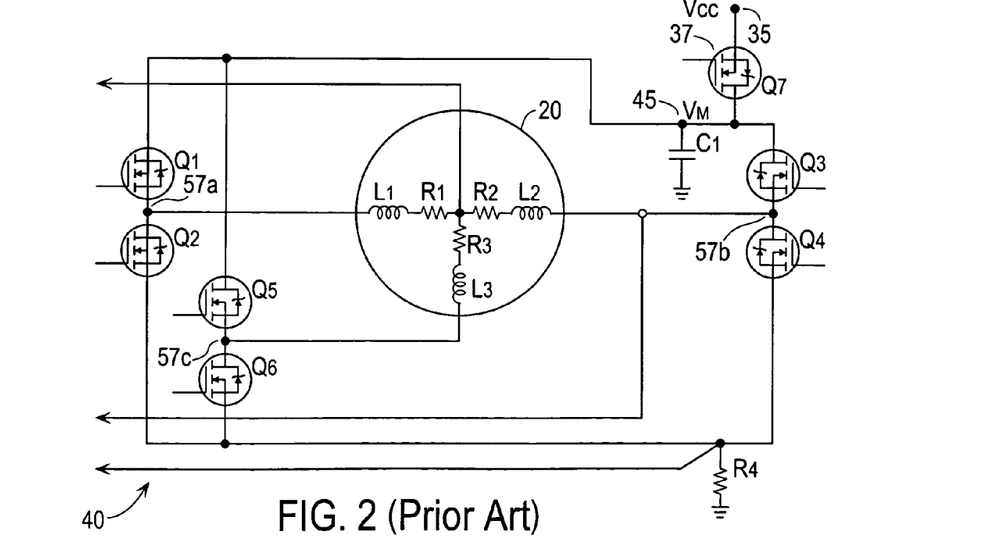
FIG. 2 is a circuit schematic of a prior art spindle motor and spindle motor drive circuit.

FIG. 2 is a circuit schematic of spindle motor 20 and spindle motor drive circuit 40. In a specific implementation, spindle motor 20 is a three-phase Y-wound DC motor, with each of its three coils shown as an inductor and resistor connected in series. These are denoted L1 and R1 for the first coil, R2 and L2 for the second coil, and R3 and L3 for the third coil. The invention is not limited to any particular motor, and other types such as delta-wound motors could also be used (with appropriate modification of some of the specific control signals).

In a specific embodiment, the motor is driven in a manner that current is only allowed to flow through two coils at a time. Thus, for a three-phase, Y-wound motor as shown, there are six possible commutation states, corresponding to the three possible pairs of coils through which current can flow, and the two possible directions of current flow. In a specific implementation, the motor has four pole pairs (eight poles), but six-pole and twelve-pole motors are also common. Since there are four pole pairs, there are four commutation cycles (or electrical cycles) per 360° mechanical rotation. The term commutation cycle or electrical cycle refers to a cycle through all the commutation states. Thus there are 24 commutation states for each 360° mechanical rotation of the spindle motor (i.e., four commutation cycles where each commutation cycle spans the six commutation states).

It is helpful to consider nomenclature relating to the commutation states. For the traditional "six-state" spindle motor drivers, only two out of three windings are energized at any time, with the third left "floating." In fact, some modern systems also have the option to drive all three windings simultaneously. These systems can be called "soft switching" and have been trademarked with names such as SilentSpin™ by Texas Instruments and SmoothDrive™ by ST Microelectronics, whose product literature states its "Smoothdrive is a voltage mode pseudosinusoidal spindle drive scheme where the duty cycles of the three windings are modulated to form sinusoidal voltages across each winding."

The term "commutation phase" may seem to some a more natural way to refer to a soft switching (pseudo-sinusoidal) environment. In the six-state system used for the examples in this application, a given coil (phase) is either sourcing or sinking or off, so it has one of three states. In the soft-switching context, all phases conduct except for one brief moment when current is at "zero" in the winding, making the definition of a "state" somewhat difficult; however, the "commutation cycle" can still be broken down into distinct "commutation phases" where the winding is either: entering its peak of sourcing, exiting its peak of sourcing, entering its peak of sinking, exiting its peak of sinking, transitioning from sink to source, or transitioning from source to sink. These sub-classifications may allow "wave shaping" of the driving signals.

For purposes of the present invention, the term "commutation state" will be used broadly to contemplate a soft-switching mode of control. From the point of view of the invention, soft switching impacts the complexity of the system (the current flow and control diagrams because of the possibility for current to flow through multiple inductors at once), but not the basic aspects of the invention.

Spindle motor drive circuit 40 includes six switching elements, denoted Q1, Q2, . . . Q6. In the specific implementation these are metal-oxide-semiconductor field effect transistors (MOSFETs), and are illustrated as such. However, MOSFETs are but a single example of possible switching elements (e.g., JFETs, bipolar transistors, BiCMOS transistors, IGBTs). For convenience, the switching elements in this embodiment, as well as switching elements in embodiments to be described below, will be referred to as transistors. The control inputs of the switching elements (gates of the transistors in the specific embodiment) receive control signals from spindle motor drive control circuit 47. The term "switching element" is intended to be broad, and does not exclude the possibility that the elements would be operated in linear mode rather than switched mode.

The transistors are configured in a three-leg bridge with transistors Q1 and Q2 forming a first leg of the bridge, transistors Q3 and Q4 forming a second leg of the bridge, and transistors Q5 and Q6 forming a third leg of the bridge. The three legs of the bridge are coupled in parallel between motor supply node 45 and a resistor R4 to ground. Each leg of the bridge provides a motor connection node at the connection point between the two transistors in that leg. These motor connection nodes are denoted 57a, 57b, and 57c. FIG. 2 also shows selective isolation switching element 37 implemented by a transistor Q7.

As shown, the voltage at the center tap (i.e., the node where the three coils are connected) and the voltage at motor connection node 57b are communicated (the latter denoted as a hollow node) to spindle motor drive control circuit 47. For simplicity similar connections for motor connection nodes 57a and 57c are not shown. Some systems monitor these voltages for reference to maintain synchronization between the actual rotor position and the control signals that drive the spindle motor. The voltages at motor connection nodes 57a, 57b and 57c can be compared to the voltage at the center tap to determine the relative position of the rotor such that the spindle motor drive control circuit 47 remains synchronized with the motor's position as it rotates.

FIG. 2 also shows a current sense resistor R4 connected to a node between spindle motor drive circuit 40 and GROUND, but the sense resistor could also be connected between motor supply node 45 ($V_M$) and spindle motor drive circuit 40. Note that if sense resistor R4 is between motor supply node 45 and spindle motor drive circuit 40, regenerated current could be monitored as it flows into capacitor C1. If the sense resistor is connected between motor drive circuit 40 and GROUND, then it is possible for a low-going flyback pulse from the motor to be clamped to the connection node by the lower MOSFETs if the signals are synchronously rectified. There may then be a recirculation path of least resistance between spindle motor 20 and motor drive circuit 40 that does not involve sense resistor R4. In this case, it may not be possible to monitor regeneration current by using sense resistor R4. Also, even if not synchronously rectified, and the body diodes of the lower MOSFETs prevent reverse current flow, then the "top" of R4 may go below GROUND, making the voltage difference across sense resistor R4 rather difficult to measure accurately. Also, so-called sense FETs, instead of a resistor, could be used to measure the motor current using current mirroring techniques.

Figure 3:
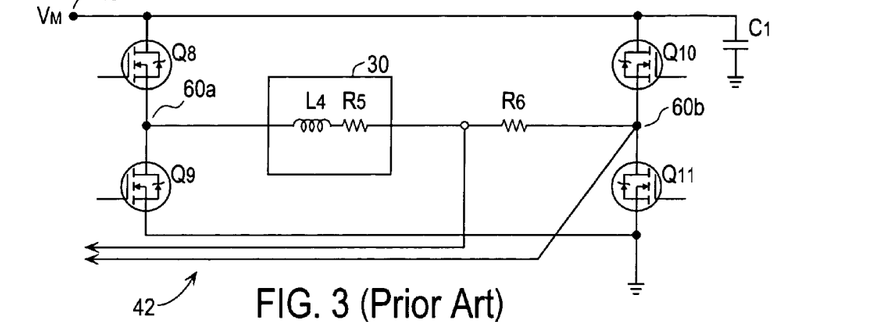
FIG. 3 is a circuit schematic of a prior art head motor and head motor drive circuit.

FIG. 3 is a circuit schematic of head motor 30 and head motor drive circuit 42. In a specific implementation, head motor 30 is a voice-coil motor (VCM), and is shown as an inductor L4 and a resistor R5 in series. The main limitation for access time is dictated by the inertial mass and dynamics of the motor, and the energy impressed upon it as a forcing function in order to alter its position. Head motor drive circuit 42 is in the form of an H-bridge, including transistors Q8 and Q9 in a first leg, and transistors Q10 and Q11 in a second leg. Each leg of the bridge provides a motor connection node at the connection point between the two transistors in that leg. These motor connection nodes are denoted 60a and 60b. The control inputs of the switching elements (gates of the transistors in the specific embodiment) receive control signals from head motor drive control circuit 50.

FIG. 3 also shows a sense resistor R6 connected to an end of the head motor (hollow node) and the corresponding motor connection node, in this instance node 60b. The sense resistor can be placed on either end of the head motor, and its function can also be implemented with sense FETs. The voltage between the hollow node and motor connection node 60b provides a voltage equal to the head motor current multiplied by the value of resistor R6. This voltage is fed back to the head motor drive control circuit 50 to create a transconductance (i.e. voltage-to-current translation) amplifier.

Spindle motor drive control circuit 47, head motor drive control circuit 50, servo processor 52, and power supply monitor 55 will typically be implemented as a single integrated circuit (IC) that may contain other functional elements not germane to the present invention. The transistors in spindle motor drive circuit 40 and head motor drive circuit 42 may be discrete power devices, may themselves be integrated on a separate IC, or may be integrated with spindle motor drive control circuit 47, head motor drive control circuit 50, servo processor 52, and power supply monitor 55 into the same IC.

Motor Control and Operation in a Conventional HDD System

Current HDD motor drive control circuits enable independent control of the spindle motor and head motor. This is accomplished by allowing the respective control circuits to manage current flow from the system power supply through their corresponding motors.

During operation, spindle motor drive control circuit 47 operates to sense the current being drawn by spindle motor 20, control the commutation states of the spindle motor, and control the spindle motor speed by sending appropriate control signals to transistors Q1, Q2, . . . Q6 in spindle motor drive circuit 40. Most conventional spindle motor drive control circuits use pulse width modulation (PWM) switching, typically combined with electronic filtering such as an analog or digital phase-locked loop (PLL) to provide efficient power conversion and accurate speed control in the presence of switching noise. However, some conventional motor drive control circuits operate in linear mode.

Most conventional head motor drive control circuits provide linear control, typically using linear (class AB mode) transconductance amplifiers, although some offer the ability to switch between linear and switched mode drive (much like class D). Linear mode is used for its accurate response and good linearity to settle and track when the currents are small, thus avoiding switching noise problems when their effects would be most critical. Switching mode may be used to improve efficiency during a seek when currents are relatively high but the amplifier is not in saturation. While linear mode may also be used, power conversion efficiency will be lower when the driver is not saturated. It is noted that when PWM was first being integrated it was more common to find the ability to select between linear and switching modes. Now that PWM has been successfully integrated in most cases, it is becoming relatively uncommon to find both modes in the same chip due to the added costs associated with silicon to support multiple modes. Generally, the decision is made a priori and the chip designed accordingly.

Figure 4A:
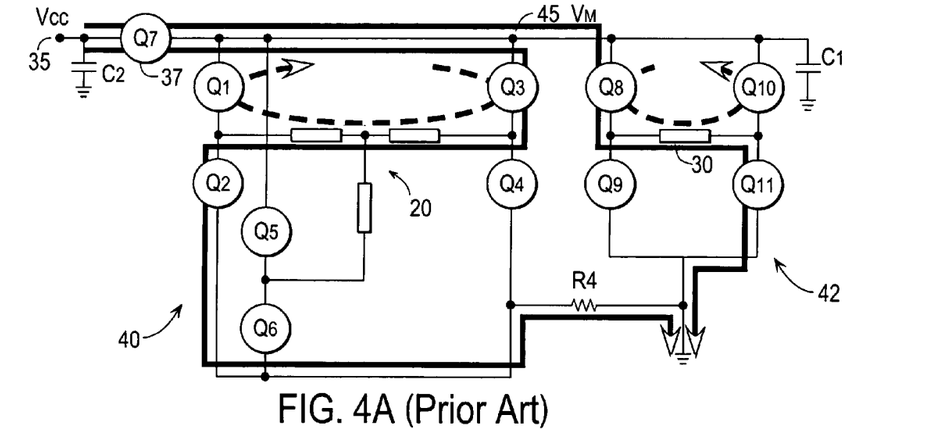
FIGS. 4A and 4B are schematics showing the operation of the prior art system during normal operation and during shutdown or power failure.
Figure 4B:
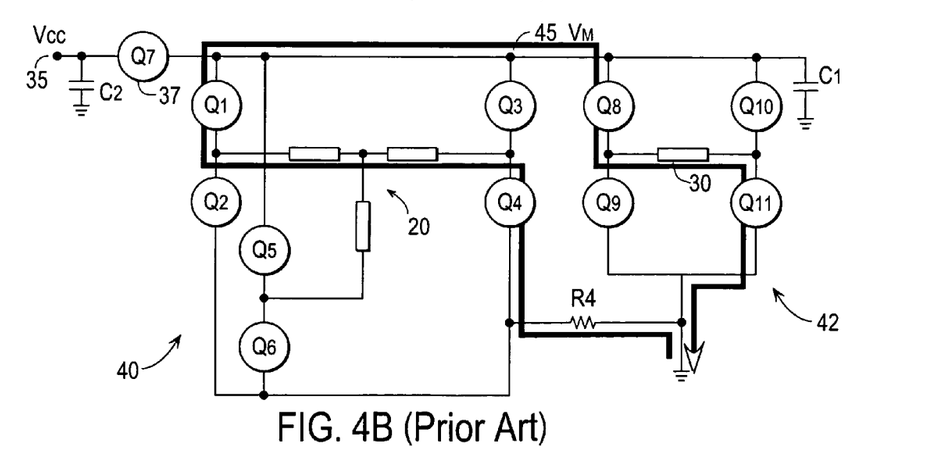

FIGS. 4A and 4B are schematics showing the operation of system 10 during normal operation and during shutdown or power failure (as determined by power supply monitor 55). The discussion for the spindle motor will be for a particular commutation state, it being understood that analogous operations occur for the other commutation states. Similarly, the discussion for the head motor will be for a particular direction, it being understood that analogous operations occur for the other direction. The description will be in terms of PWM switched mode since different events occur during the PWM on-time intervals and off-time intervals. For linear mode, the events will correspond to the PWM on-time events. That is, FIG. 4A shows current paths for spindle motor 20 and head motor 30 during normal operation. The figure is simplified in that the switching elements are drawn as numbered circles and the motor coils are drawn as unlabelled rectangles. Heavy solid lines show the current paths during a PWM on-time interval, while heavy dashed lines show the current paths during a PWM off-time interval. The spindle motor and head motors operate independently, so there is no requirement that any of the illustrated spindle motor currents would be flowing at the same time as the illustrated head motor currents. During normal operation, that is when it is determined that the system power supply voltage Vcc is within acceptable limits, selective isolation switching element (Q7 in a specific implementation) is maintained on by power supply monitor 55.

The number of PWM pulses during a single commutation state is on the order of 10-100. Generally, for common HDDs, there are six-pole, eight-pole, or twelve-pole motors running at somewhere between 3600 RPM to 15,000 RPM.

Taking a 10,000-RPM, eight-pole motor as a reference, the electrical/commutation frequency will be:

(10,000 RPM)*(24 commutation states/physical rotation)/(60 seconds/minute)=4000 commutation states/second (i.e., 4 kHz).

A typical range for common HDDs is on the order of 1 kHz-9 kHz. It is preferred to have the PWM frequency above the audible range, say above 20 kHz, but not so high as to encounter excessive switching losses. A value less than 100 kHz-200 kHz is generally acceptable. Thus for a PWM carrier at, say 96 kHz with the 4 kHz commutation frequency gives about 24 PWM cycles per commutation period. This may range from say 10 to 100 PWM cycles per commutation period for a variety of HDDs. Many modern control circuits allow this number to be programmed over some range of values to meet some range of design targets according to the market the chip is trying to target.

Spindle motor drive control circuit 40 turns transistors Q1, Q2, . . . Q6 on and off to establish the proper current flows for each commutation state. Thus the switching is synchronized to the spindle motor's rotation. Further, the duration of the on-time intervals is controlled to establish a desired rotation speed. For the particular PWM on-time interval shown in FIG. 4A, transistors Q3 and Q2 are turned on, while transistors Q1 and Q4 are turned off. This establishes current flow from Vcc through transistor Q7, transistor Q3, the motor coil defined by inductor L2 and resistor R2, the coil defined by inductor L1 and resistor R1, and transistor Q2 to the return path the ground.

For the power-off interval of spindle motor 20, transistor Q2 is turned off, and transistors Q1 and Q3 are turned on, thereby shorting the motor terminals between which the current had been flowing. Since the current through inductors L1 and L2 in the coils cannot stop instantaneously, this short circuit provides a recirculation path for the current, which decays exponentially. This is shown schematically as an elliptical arc around the upper half of the bridge with current flow in the clockwise direction. Alternatively, transistor Q3 could be turned off and then transistor Q4 turned on to provide a recirculation path in the counterclockwise direction through transistors Q2 and Q4. It should be remembered that FIG. 4A shows but one of six commutation states, but the analysis is the same for the others, just with a different pair of transistors switched on during the PWM-on portion of the cycle and then the recirculation path established during the PWM-off portion of the cycle.

Head motor drive control circuit 50 turns transistors Q8, Q9, Q10, and Q11 on and off to establish the proper current flows for the two possible directions of motion. For a particular PWM on-time for one direction of motion, transistors Q8 and Q11 are turned on, and transistors Q9 and Q10 are turned off to provide a current path through the motor. In particular, the current flows from Vcc through transistor Q7, transistor Q8, the motor coil defined by inductor L4 and resistor R5, and transistor Q11 to the return path the ground. For the other direction of motion, Q10 and Q9 would be switched on, and Q8 and Q11 would be switched off. In this case, the current would flow from right to left through the motor as drawn.

For the power-off interval of head motor 20, transistor Q11 is turned off and then transistor Q10 is turned on. This shorts the motor terminals and provides a recirculation path in the counterclockwise direction around the upper half of the bridge. Alternatively, transistor Q8 could be turned off and then transistor Q9 turned on to provide a recirculation path in the clockwise direction in the lower half of the bridge. Again, as in the case of the spindle motor drive, for linear drive rather than PWM switched mode, the appropriate transistors will be switched to allow a certain amount of current to flow during the entire head movement cycle.

In some cases, the decision of which transistors to turn on and off during the power-off intervals (for the spindle and head motors) is a matter of choice, and sometimes also generally a legacy issue associated with the original implementation/design library for a particular product line. One thing that may influence the choice is whether or not the output stages consist of all N-MOSFETs or complementary pairs of P (upper) and N (lower) channel MOSFETs, and the ease with which the gate driver circuits can control them. Also, since N-MOSFETs generally have historically had lower resistance for the same die size, the power dissipation associated with controlling the respective type of transistor may be a factor.

FIG. 4B shows current paths for spindle motor 20 and head motor 30 during power-down or in the event power is lost suddenly as a result of an unpredictable event. A common approach in the case of power failures is to extract energy from the rotating spindle motor and disk in order to park the head safely without bleeding energy back into the possibly failed power supply. This is known as regenerative braking. With rare exceptions, the power supply is used to park the disk head during normal commanded power-down (i.e., transistor Q7 is on).

Heavy solid lines show the current paths during one commutation state of the power-down interval. The loss of power would normally be detected by power supply monitor 55, which would directly or indirectly cause transistor Q7 to be turned off. The value for capacitor C1 is selected to be large enough to store sufficient charge to help maintain enough voltage to drive the emergency power down circuits long enough to complete the operation. Other similar mechanisms may exist, but this one is common.

Consider the commutation state when, during normal operation, current was flowing through transistors Q3 and Q2 as shown in FIG. 4A. Transistors Q3 and Q2 are turned off, thereby interrupting the normal current flow (from right to left through the motor coils defined by inductor L2 and resistor R2 and inductor L1 and resistor R1 in FIG. 2). Since the induction opposes this interruption, the body diodes of transistors Q1 and Q4 are forward biased and conduct parallel to the MOSFET channels to supply current to head motor 30 to drive it in the direction required to park the head. Alternatively, transistors Q1 and Q4 may be synchronously activated to conduct through the MOSFET channels in order to minimize conduction losses.

Considering the different commutation states, the operation can be described as follows. The three-phase spindle back-EMF is rectified through transistors Q1, Q3, and Q5 to supply a rectified DC voltage to head motor 30, while the three-phase spindle back-EMF is rectified through transistors Q2, Q4, and Q6 to complete the rectifier circuit. Transistors Q2, Q4, and Q6 provide the current recirculation path for the rectified DC voltage supplied to the head motor. The circuit GROUND provides the low-side voltage reference to which other signals are referred. The voltage at $V_M$ provides the high-side voltage reference to which other signals are referred. Actual voltages may depend on any other DC bias voltages which may be present in the circuitry.

Structure of an Embodiment

Figure 5:
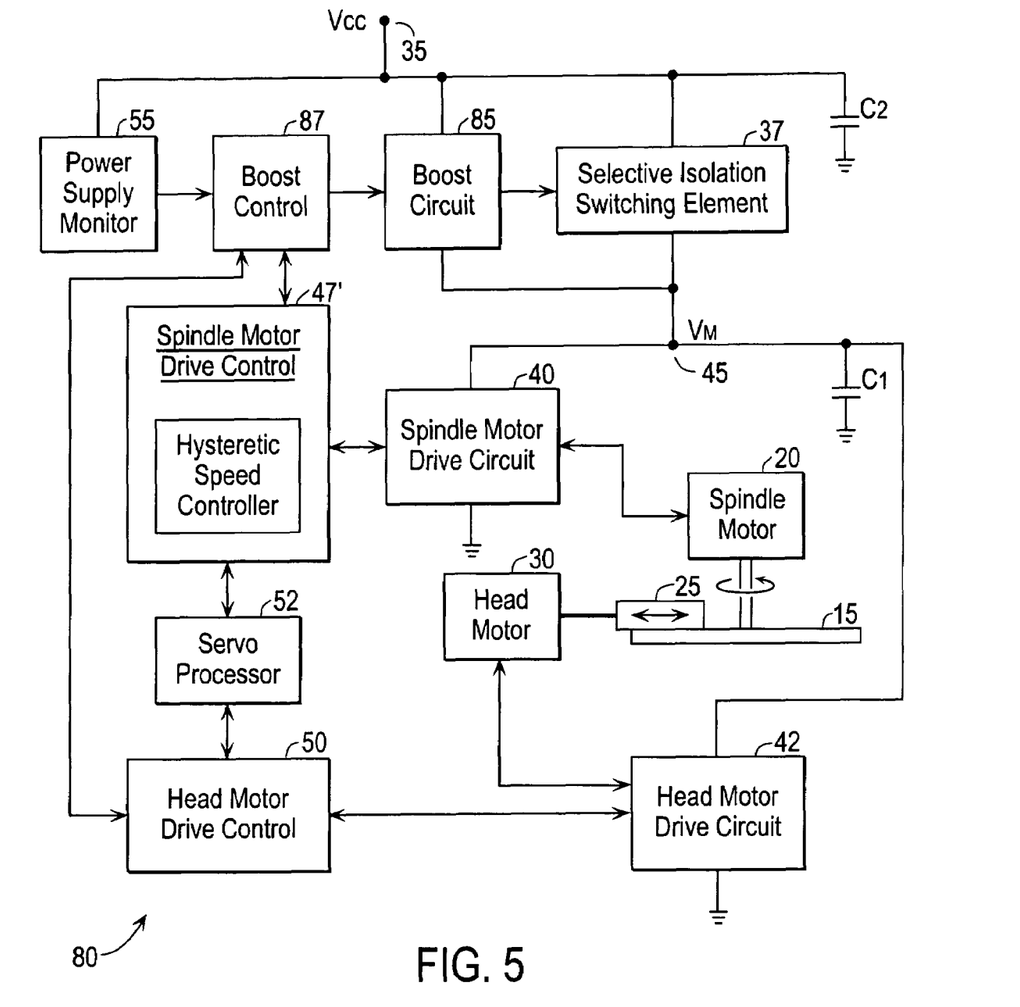
FIG. 5 is a block diagram of a system for powering and controlling a disk drive according to an embodiment of the present invention.

FIG. 5 is a block diagram of a system 80 for powering and controlling a disk drive according to an embodiment of the present invention. This embodiment represents an enhancement of the conventional system shown in FIG. 1, and as such corresponding elements are shown with corresponding reference numerals. In short, embodiments of the invention provide a regenerative braking mode that is invoked during normal operation. As mentioned above, in this context, normal operation means that power to the disk drive is within acceptable limits and that further read and/or write operations are contemplated. For example, embodiments of the present invention provide the ability to increase the drive current to head motor 30 during seek operations by entering the regenerative braking mode. This mode entails operating spindle motor 20 as a generator, and converting its stored kinetic energy into additional power to drive head motor 30. In some instances, for battery-powered systems, the regenerative braking mode could be used to use the kinetic energy once the disk head has been parked safely, to charge up the battery.

In addition to the conventional elements that include spindle motor drive circuit 40, head motor drive circuit 42, servo processor 52, head motor drive control circuit 50, and power supply monitor 55, the system includes an enhanced spindle motor drive control circuit 47', a boost circuit 85, and a boost control circuit 87. Boost control circuit 87 communicates with boost circuit 85, selective isolation switching element 37, spindle motor drive control circuit 47', and head motor drive control circuit 50. The boost circuit is coupled between system supply node 35 and motor supply node 45. It is noted that not all embodiments require a boost circuit.

Figure 6:
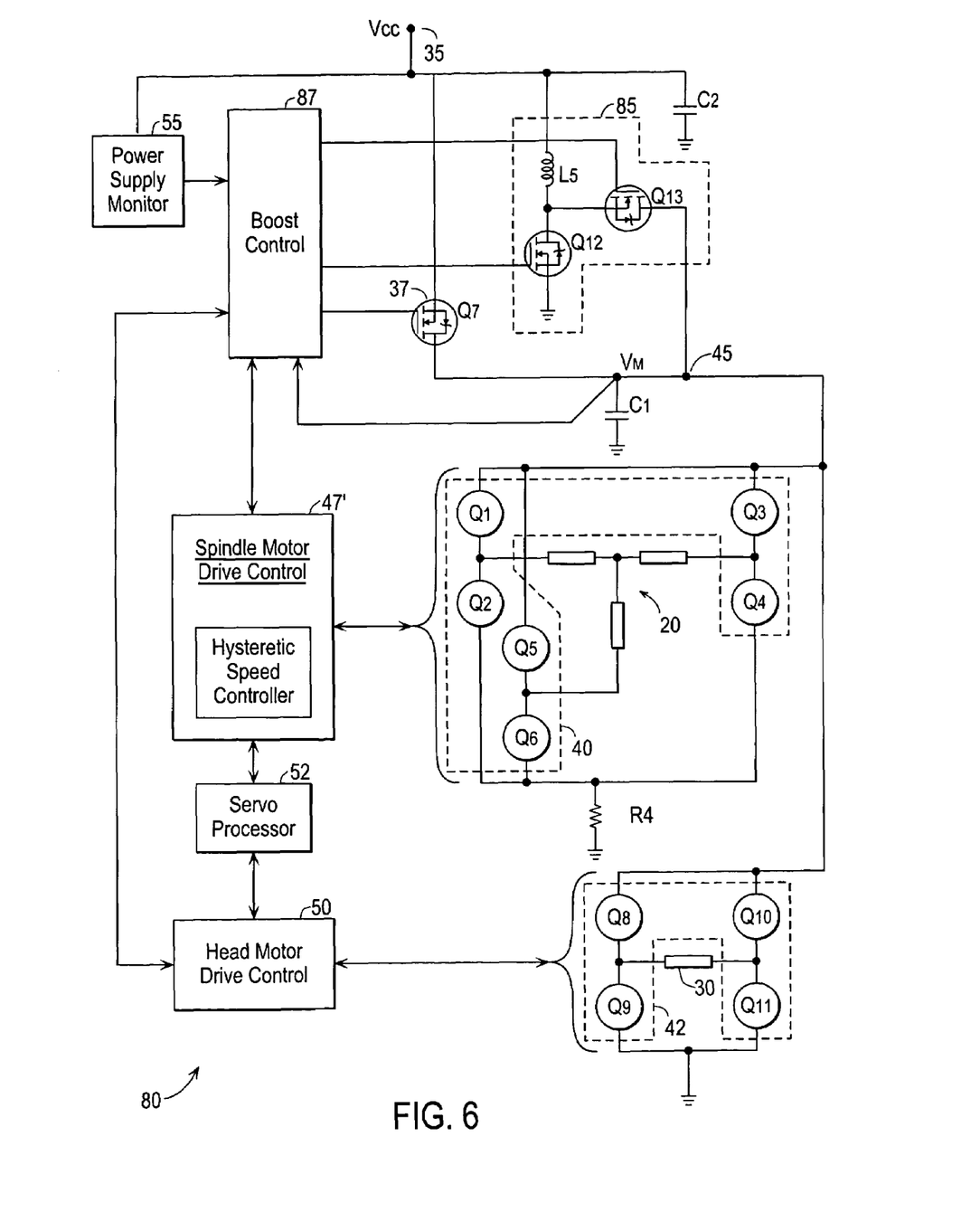
FIG. 6 a more detailed diagram of a system for powering and controlling a disk drive according to an embodiment of the present invention.

FIG. 6 a more detailed diagram of one implementation of system 80 where boost circuit 85 is implemented as a boost regulator (boost converter). The figure shows spindle motor 20, head motor 30, spindle motor drive circuit 40, and head motor drive circuit 42 in the same simplified representation as shown in FIGS. 4A and 4B. The boost regulator includes an inductor L5, a transistor Q12, and a transistor Q13. Storage capacitor C1 also forms a part of the boost regulator circuit. Inductor L5 and transistor Q12 are connected in series between system supply node 35 (Vcc) and ground, while transistor Q13 is connected between the node between Inductor L5 and transistor Q12 and motor supply node 45 ($V_M$). This is but one possible implementation of boost circuit 85.

For example, a diode could be substituted for transistor Q13, and boost regulators can also be made with capacitors instead of inductors. Further, boost circuit 85 could be implemented as a charge pump. Additionally, transistors Q7 and Q13 could be combined to achieve similar function with fewer components with the caveat that during "normal usage" when the boost function is not active, the combined Q7/Q13 acts as a pass element and additional losses are encountered through inductor L5, which may then further constrain the selection of C1 and/or C2. Another caveat is that the combined Q7/Q13 losses during "boot mode" operation would have to be considered along with complexity of control when deciding whether or not to conduct through the body diode or to operate it synchronously in conjunction with transistor Q12.

The figure shows switching elements Q1, . . . Q6 associated with spindle motor drive circuit 40 and switching elements Q8, . . . Q11 associated with head motor drive circuit 42. As noted above, referring to these elements as "switching elements" does not preclude their being operated in linear mode when desired. That is, the term "switching element" is to be interpreted as covering such devices, even if operated in linear mode rather than switched mode.

Motor Control and Operation of an Embodiment

As mentioned above, system 80 includes a regenerative braking mode that, in contrast to prior art regenerative braking, is entered during normal operation, for example to provide extra current to head motor 30 during a seek operation without exceeding overall power supply limitations. In this mode, selective isolation element 37 is turned off, and transistors Q1 . . . Q6 are switched along the lines shown in FIG. 4B to charge up capacitor C1 at motor supply node 45.

While data is not being written or read during a seek operation, it is still necessary that the spindle speed be sufficient to read the position information for tracking. Accordingly, spindle motor drive control circuit 47' is provided with a hysteretic speed control monitor that will make sure to override a regenerative brake if the spindle speed drops too low. Further, the control can make use of error amplifier signals and thresholds associated with errors between commanded and actual VCM currents to determine if regenerative braking or supply voltage boosting may be appropriate/beneficial to a seek operation.

Therefore, the amount of braking permitted depends on the particular design, but it is generally contemplated that regenerative braking will only be invoked for a fraction of each commutation cycle. Thus, for a given commutation cycle, transistors Q1 . . . Q6 will be controlled along the lines shown in FIG. 4A for some portions of the cycle, and the transistors will be controlled along the lines shown in FIG. 4B for other portions of the cycle. Indeed, the division can be finer, i.e., at the level of the individual commutation states within a given commutation cycle. In some embodiments containing a separate boost circuit 85, the boost circuit may be activated to allow current to flow from system supply node 35 (Vcc) to motor supply node 45 ($V_M$) when voltage $V_M$ is greater than voltage Vcc.

The fraction of time during a seek that regenerative braking will be commanded to occur depends on a number of factors. These factors include the relative inertial masses of the spindle stack and the VCM, the seek profile of the machine, its spindle motor RPM, and the operating duty cycle. Seek duty cycles vary for different conditions, such as random access, full-volume access, or sequential access, and also depend on the machine's ability to queue commands in order to minimize time to data. Nevertheless, speaking in terms of "averages," an average seek time may be several milliseconds, and an average mechanical rotation period may be several milliseconds (6000 RPM translates to 10 milliseconds per mechanical rotation). If the HDD is operating in this mode for the periods of peak acceleration and deceleration, the seeks can be subdivided accordingly. Thus regenerative braking might occupy something like 30% of a seek, which may on average be on the order of 5-10% of a mechanical revolution. If there are multiple operations per revolution, then perhaps at 2-3 seeks/revolution on average, this may be 10%-30% of a revolution.

At one level, the operation can be regarded as dynamically isolating and controlling the voltages at motor supply node 45 to manage the voltages available to spindle motor 20 and head motor 30. For example, during the regenerative braking mode, it is possible to turn off various transistors in the spindle motor drive circuits and force the current to flow through the transistor body diodes (or transistor channels if synchronously controlled) in the opposite direction that would normally flow during the non-regenerative-braking operation. This allows the supply voltage to one or both motors to be increased above the system supply voltage level (Vcc). Boost circuit 85, for example, can be used to boost the voltage at motor supply node 45, while still guaranteeing a minimum voltage from the system supply. Separate voltage control loops can be implemented to set the isolated node voltage to desired levels by controlling the energy supplied to it from the system supply.

With respect to the specific embodiment of FIG. 6, during commutation cycles where Q7 is turned on (i.e., non-regenerative braking mode), transistors Q12 and Q13 would be off. During regenerative braking, transistor Q12 is turned on in order to build up current through inductor L5 with transistor Q13 off. Then transistor Q12 is turned off and transistor Q13 turned on. The current through inductor L5 is then supplied to motor supply node 45 at a voltage above Vcc. It was noted above that the regenerative braking mode will typically be maintained for only a fraction of a given commutation state. Further, the regenerative braking mode may be invoked over a sequence of adjacent commutation cycles, or less frequently.

The operation in some sense resembles that of class G or class H amplifiers; the system can be viewed as a sort of hybrid that also relies on class D (that is switching) operation (in other words, a class "D-G/H" system). The operation of the motor control circuits does not have to switch synchronously with the boost converter. Transistor Q12 can be switched on and off during the regenerative-braking-mode commutation phase if the voltage impressed upon $V_M$ by the regenerative brake is insufficient to allow the desired VCM current to be reached (once $V_M$ boosts to be higher than Vcc, the supply will stop sourcing current). If the regenerative brake can handle it alone, then there may be no need to activate Q12. However, since there must be a net influx of energy to the system to prevent severe deceleration of the spindle motor, Q12 can also be used to help provide constant power to $V_M$.

In this way, the load variation of the system can be reduced, in essence, from the perspective of Vcc. Then, as the regenerative braking cycle reverts back to normal conduction mode for the spindle motor (assuming a seek is still in progress, for example), the spindle PWM duty cycle can be reduced (since it is now running from a higher $V_M$ voltage), and it can quickly recharge the motor coil to keep the spindle at speed while also allowing some of that energy to be removed again for the VCM on the next cycle. The whole time this is happening, the VCM can be drawing power from $V_M$ as well.

If the VCM and spindle PWM ran at the same frequency, the spindle regenerative brake could be made to activate while the VCM was conducting, and the VCM could recirculate current while the spindle was conducting normally. That would help minimize the load variation from the boost converter. Letting the boost converter run faster than the PWM rate would also allow it to respond better to changes in demand resulting from the interaction of the motor control circuits. The boost converter could operate from several tens of kHz to possibly the MHz region if it can do so efficiently. In addition to response time, higher frequency would allow a smaller value for inductor L5. The spindle PWM frequency is adjusted according to the method described above and would also be above 20 kHz and preferably closer to 100 MHz (or more).

Simulations

Figure 7A:
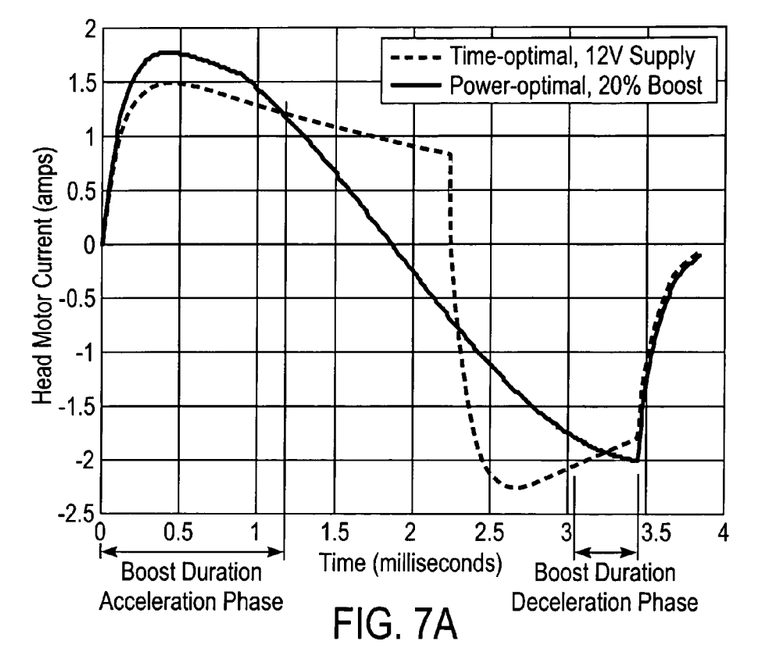
FIG. 7A includes plots of current as a function of time for each of two seek profiles, comparing a power-optimal profile in accordance with an embodiment of the present invention with a conventional bang-bang or time-optimal profile.

FIG. 7A includes plots of current as a function of time for each of two seek profiles. The first is a profile, referred to as a "power-optimal" profile in accordance with an embodiment of the present invention, and is shown as a solid line. The second is a conventional bang-bang or time-optimal profile, and is shown as a dashed line. The particular power-optimal profile is characterized by a 20% increase in head motor current during an acceleration phase, and can also be seen to reduce the absolute maximum amplitude required for deceleration.

Figure 7B:
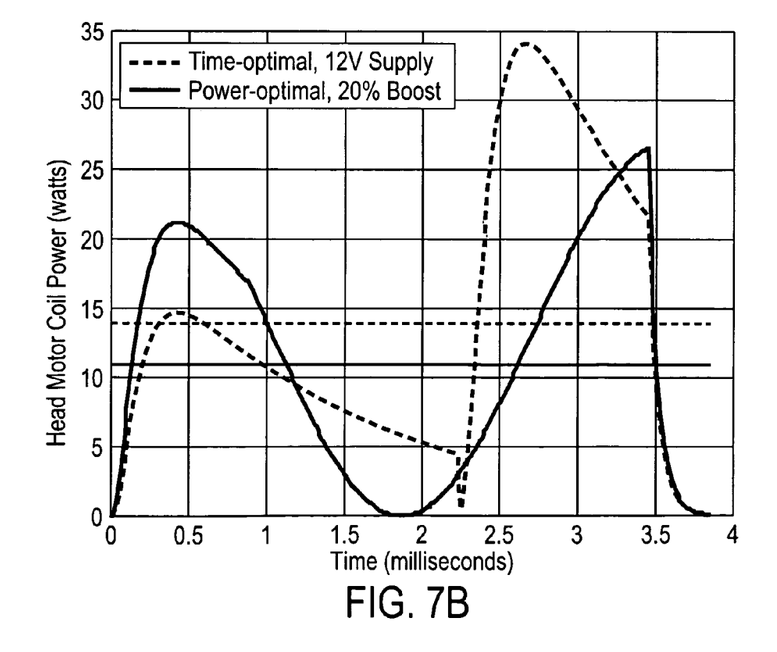
FIG. 7B includes plots of instantaneous power as a function of time for each of the two seek profiles of FIG. 7A.

FIG. 7B includes plots of instantaneous power as a function of time for each of the two seek profiles. Consistent with the plots of FIG. 7A, the instantaneous power for the power-optimal profile is higher during acceleration and lower for deceleration relative to the conventional time-optimal profile. The average power levels are also shown, with the power-optimal profile average power being on the order of 20% lower.

Figure 7C:
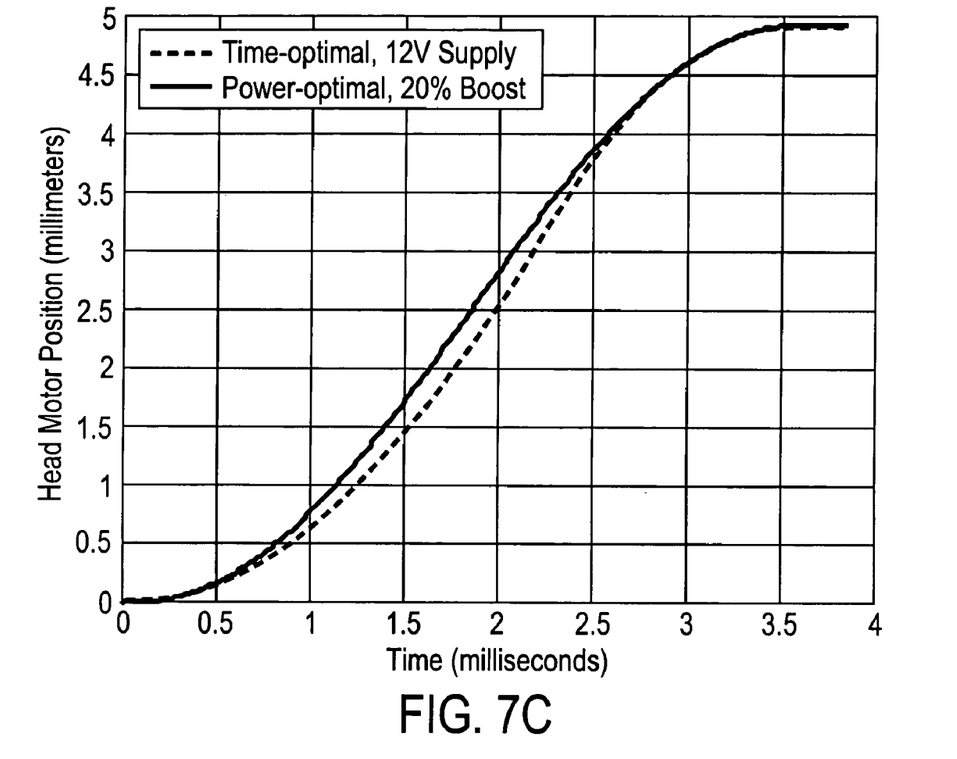
FIG. 7C includes plots of head position as a function of time for each of the two seek profiles of FIG. 7A.

FIG. 7C includes plots of head position as a function of time for each of the two seek profiles. As can be seen, the profiles are very similar. That is, an equivalent distance is covered in equivalent time so that equal performance is achieved with both profiles. While this embodiment provides equal seek performance with a 20% power saving, it is also possible to achieve increased seek performance with equivalent power. Other time-varying profiles can be generated which would result in slight variations in the results.

The above described plots are simulation results using parameters of one set of heritage IBM HDD VCM parameters, first with nominal $V_M$, and then again with a constant $V_M$ boost when the VCM current would have otherwise saturated as shown in the other (non-boosting) profile. The simulation considers effects of back EMF on the VCM current as the VCM moves. Hence, the peak current achieved at acceleration and the initial, constant-sloping decay in current is due to back EMF as well as electrical time constant. That is why the constant supply boost has a similar characteristic initially (although it is noted that a larger supply results in faster rise time because of the increased EMF across the motor coil). After that, the requested current is below the saturation limit for the boosted supply (and fully saturated for the nominal supply case, since the VCM is still accelerating to its target velocity). This is where the seek algorithm affects power consumption by taking advantage of the available acceleration (in an electric motor, current is proportional to acceleration—a value proportional to velocity therefore can be obtained by integrating current, and position by integrating yet again).

The simulation does not comprehend regenerative braking of the spindle motor, but rather takes as an input the available power supply voltage. In this case, that would be supplied through some combination of regenerative braking and/or boost conversion. The simulation estimates achievable performance based on the type of profile and available supply, and suggests the desirability of regenerative braking with other than a time-optimal profile. The simulation provides estimates of the kinetic energy of the spindle assembly and the energy required to accelerate the VCM. These estimates indicate that, for the duration of time of the peak acceleration, it is possible to utilize this energy transfer from spindle motor to VCM with what is expected to be acceptable variation in rotational speed. Furthermore, the use of the boost converter to maintain a constant influx of energy should help achieve reduced peak-to-average power consumption and probably re-optimize the system for lower average power consumption as well.

Design Considerations and Possible Further Implementation Details

As discussed above, operation according to embodiments of the present invention results in voltages at motor supply node 45 ($V_M$) above the system supply level Vcc (typically 5 volts or 12 volts for most HDD applications). Accordingly, spindle motor drive circuit 40 (which includes transistors Q1-Q6) and spindle motor drive circuit 42 (which includes transistors Q8-Q11) need to be designed using a technology capable of handling higher voltages than the system supply voltage. Existing, mature, mixed-signal BiCMOS processes exist that can operate around 20 volts to 30 volts, and discrete power transistors can also be found to tolerate these voltages, and thus would tolerate upward of twice the nominal level of the system supply.

Additionally, supply compensating circuits may be required to provide adequate power supply rejection. Such circuits are readily available to compensate for smaller disturbances in the system supply level. One example is a supply-voltage-compensating circuit that uses an analog-to-digital converter (ADC) to modulate the amplifier output waveform to maintain constant load voltage regardless of supply level. Such voltage feed-forward circuits could be modified to compensate for larger variations in the motor supply node while maintaining accurate control of the motor in question.

A voltage control loop can be used to monitor the duty cycle applied to the spindle motor to maintain the desired voltage at the motor supply node. The signal to initiate the regenerative braking action may be derived from a request to accelerate head motor 30 from one track to another. One possible source of such a signal may be to monitor when the error amplifier output used to control head motor current exceeds a predetermined magnitude or slope (derivative with respect to time). Such an assist from the spindle motor may reduce peak current seen by the system supply during a seek.

This function is mutually exclusive with driving the spindle to maintain speed, so the motor will begin to decelerate by design. Additional current is subsequently delivered to the spindle motor from the system supply after the beginning of the seek event in order to stay within the allowable speed tolerance. To limit peak current, this increase preferably occurs outside of the period where seek current is highest. This is not a problem because the operating modes are mutually exclusive. Because of the response time (bandwidth) of the spindle, this current may be increased at lower levels over longer time periods than it was extracted. The effect would be to deliver the required average power to the HDD while limiting the peak current seen by the system supply.

This potential benefit would occur at the expense of larger speed variation during normal operation. Logic monitoring the rotational speed of the spindle combined with a set of control registers can be used to enable or disable this function such that spindle speed can be maintained above a target that would begin to introduce errors. This monitoring could be accomplished with dedicated hardware or with microprocessor intervention by monitoring the frequency of a motion feedback signal or a commutation PLL reference, for example. Such a feature is necessary to maintain acceptable limits on proper servo and data channel synchronization to the magnetic patterns written on the disk(s).

Operating the drivers and isolated supply node in this way, and utilizing existing available features, the configuration of head motor drive control circuit 50 may be extended to operate in multiple modes. In addition to conventional modes, which would include a linear class AB mode and a switched mode much like class D, both from a constant system supply voltage level, embodiments could provide additional modes. Some of these addition modes would boost the supply voltage by approximating amplifier modes such as class G (where the supply is raised to a higher level independent of input signal), class H (where the supply tracks the driver input to drive higher currents when necessary), or a combined class D-G/H mode where the supply is boosted beyond the level where the driver would saturate, and the driver operates in switched mode to minimize power dissipation. By combining modes, the efficiency as well as the driving capability of head motor drive control circuit 50 can be increased. This topology can allow for improved flexibility in choosing the electromechanical design point and managing the power vs. seek time tradeoffs for the overall HDD design.

By implementing the regenerative braking mode within head motor drive control circuit 50, overall system efficiency may also be improved by allowing energy to be transferred back to the spindle motor during brief intervals of a seek following actuator acceleration. To maintain move time performance, decision-making circuitry can monitor the back-EMF (or velocity) and/or current (or acceleration) errors. These errors are computed using digital computation or analog summing amplifiers as the differences between the actual levels fed back from the head motor and the desired levels commanded by the control system. Using varying resolution of decision making (either analog or digital) provides flexibility allowing the system to operate according to the performance needs of the application. Zero to very small errors may allow the head motor to coast (braking disabled) if peak velocity or coil power must be limited but the required distance has not yet been traveled.

Slow to moderate deceleration of head motor 30 may be achieved with the regenerative braking described above applied to the head motor to correct small errors. During this time, energy may be transferred back to the spindle motor via motor supply node 45 to assist the power supply in maintaining spindle speed. More aggressive deceleration would be forced when errors are large by actively driving head motor 30 in one of the active modes described above. The combined sources of the system power supply and spindle motor (if speed conditions are met) would provide the energy to slow down the VCM in this case. Additional register control logic can be gated with the error-loop-monitoring circuit(s) to control the feature either autonomously or with microprocessor intervention.

CONCLUSION

In conclusion, it can be seen that embodiments of the present invention can provide improved system power consumption without compromising performance. For example, by actively managing motor voltage and supply isolation using transistor Q7, and clamping off the spindle motor's recirculation path to force kick-back from the spindle motor's coils, it is possible to effect regenerative braking and boost the voltage available to the head motor during peak demands such as seek operations.

While the above is a complete description of specific embodiments of the invention, the above description should not be taken as limiting scope of the invention as defined by the claims.

What is claimed is:

1. In a disk drive control circuit wherein, during normal operation, control logic controls a plurality of switching elements to provide electrical power to a spindle motor and head motor of the disk drive from a voltage source coupled to first and second voltage supply nodes, the spindle motor having a set of motor windings to which the electric power is applied to rotate the spindle motor, the improvement wherein:

the control logic is configured to enter a regenerative braking state during normal operation where the switching elements are controlled to isolate the spindle motor from the first voltage supply node and cause regenerative braking of the spindle motor so that kinetic energy due to rotation of the spindle motor is converted to electrical power that is supplied to the head motor by virtue of inductance of one or more motor windings in the set, and the control logic enters the regenerative braking state with the spindle motor isolated from the first voltage supply node for at least a portion of at least one seek operation to be performed by the disk drive.

2. The improvement of claim 1 wherein:

the control logic is implemented in a self-contained HDD system having a battery;

the control logic is further configured to sense a commanded power-down condition, and in response to which causes regenerative braking of the spindle motor so that kinetic energy due to rotation of the spindle motor is converted to electrical power that is used to recharge the battery.

3. In a disk drive control circuit wherein, during normal operation, control logic controls a plurality of switching elements to provide electrical power to a spindle motor and head motor of the disk drive from a voltage source coupled to first and second voltage supply nodes, the spindle motor having a set of motor windings to which the electric power is applied to rotate the spindle motor, the improvement wherein:

the control logic is configured to enter a regenerative braking state during normal operation where the switching elements are controlled to isolate the spindle motor from the first voltage supply node and cause regenerative braking of the spindle motor so that kinetic energy due to rotation of the spindle motor is converted to electrical power that is supplied to the head motor by virtue of inductance of one or more motor windings in the set; and the control logic is further configured to sense a condition where the spindle motor speed falls outside a desired range, and in so sensing, prevent the regenerative state from being entered.

4. The improvement of claim 1 wherein:

at least one of the switching elements is configured as part of a boost circuit coupled between the first voltage supply node and the head motor; and the control logic activates said boost circuit during said regenerative braking state.

5. The improvement of claim 1 wherein the control logic enters said regenerative braking state for a seek operation to be performed by the disk drive.

6. The improvement of claim 1 wherein:

the spindle motor is a multi-phase motor having a plurality of commutation states;

the control logic is configured to enter regenerative braking states for at least some of said commutation states; and the control logic enters respective regenerative braking states for each of a contiguous sequence of commutation states.

7. The improvement of claim 1 wherein:

the spindle motor is a multi-phase motor having a plurality of commutation states;

the control logic is configured to enter regenerative braking states for at least some of said commutation states; and the control logic enters respective regenerative braking states for each of a non-contiguous sequence of commutation states.

8. In a circuit for controlling power supplied to a spindle motor and a head motor of a disk drive from a voltage source coupled to first and second voltage supply nodes, wherein during normal operation the circuit provides a conduction path through a switching element to a motor supply node, and includes a spindle motor drive circuit and a head drive motor drive circuit that provide conduction paths from the motor supply node to the second voltage supply node to energize the spindle motor and the head motor, the improvement comprising:

a control circuit that operates at specified times during normal operation to cause the switching element to prevent current flow between the first voltage supply node and the motor supply node, configure the spindle motor drive circuit to cease driving the spindle motor and allow the spindle motor to supply current to the motor supply node, and configure the head motor drive circuit to energize the head motor with current flowing from said first voltage supply node and current supplied by the spindle motor, wherein at least some of the specified times occur during a seek operation to be performed by the disk drive.

9. The improvement of claim 8, and further comprising a boost circuit coupled between said first voltage supply node and said motor supply node.

10. The improvement of claim 9 wherein said control circuit further operates at said specified times during normal operation to activate the boost circuit to allow current to flow from the first voltage supply node to the motor supply node.

11. The improvement of claim 9 wherein said boost circuit is a synchronous boost converter comprising an inductor and at least one switching element.

12. A circuit for controlling a spindle motor and a head motor of a disk drive, the circuit comprising:

first and second voltage supply nodes;

a switching element coupled between said first voltage supply node and a motor supply node;

a spindle motor drive circuit coupled between said motor supply node and said second voltage supply node, said spindle motor drive circuit including nodes for coupling to respective spindle motor connection nodes;

a head motor drive circuit coupled between said motor supply node and said second voltage supply node, said head motor drive circuit including nodes for coupling to respective head motor connection nodes;

a boost circuit coupled between said first voltage supply node and said motor supply node; and a control circuit coupled to said switching element, said spindle motor drive circuit, said head motor drive circuit, and said boost circuit;

said control circuit being configured with a set of one or more spindle motor drive states wherein:

said switching element is set to allow current flow between said first voltage supply node and said motor supply node, said spindle motor drive circuit is configured to energize the spindle motor with current flowing between said motor supply node and said second voltage supply node, and said boost circuit is not activated;

said control circuit being configured with a set of one or more regenerative braking states wherein:

said switching element is set to prevent current flow between said first voltage supply node and said motor supply node, said spindle motor drive circuit is configured to allow the spindle motor to supply current to said motor supply node, said boost circuit is activated to allow current to flow from said first voltage supply node to said motor supply node, and said head motor drive circuit is configured to energize the head motor with current flowing from said first voltage supply node and current supplied by the spindle motor; and said control circuit enters at least one of said regenerative braking states during at least a portion of at least one seek operation to be performed by the disk drive.

13. The circuit of claim 12 wherein:

said spindle motor is a multi-phase motor having a plurality of commutation states;

said set of regenerative braking states includes regenerative braking states for at least some of said commutation states; and said control logic is configured to enter respective regenerative braking states for each of a contiguous sequence of commutation states.

14. The circuit of claim 12 wherein:

said spindle motor is a multi-phase motor having a plurality of commutation states;

said set of regenerative braking states includes regenerative braking states for at least some of said commutation states; and said control logic is configured to enter respective regenerative braking states for each of a non-contiguous sequence of commutation states.

15. A hard disk drive circuit for controlling a spindle motor and a head motor, the circuit comprising:

first and second voltage supply nodes;

a selective isolation switching element coupled between said first voltage supply node and a motor supply node;

first and second bridge circuits coupled in parallel between said motor supply node and said second voltage supply node;

said first bridge circuit including a plurality of parallel branches, each branch including at least one switching element and an intermediate spindle motor connection node for coupling to a respective node of the spindle motor;

said second bridge circuit having a plurality of parallel branches, each branch including at least one switching element and an intermediate head motor connection node for coupling to a respective node of the head motor;

each switching element having a respective control input responsive to input signals for controlling a state of that switching element;

a boost circuit coupled between said first voltage supply node and said motor supply node, said boost circuit having a control input; and control logic coupled to said control input of said selective isolation switching element, to said control inputs of said switching elements in said first and second bridges, and to said control input of said boost circuit;

said control logic being configured to generate control signals during normal operation for operation in a set of one or more spindle motor drive states wherein:

said selective isolation switching element is set to allow current flow between said first voltage supply node and said motor supply node, said first bridge circuit is configured to energize the spindle motor with current flowing between said motor supply node and said second voltage supply node, and said boost circuit is not activated;

said control circuit being configured to generate control signals during normal operation for operation in a set of one or more regenerative braking states wherein:

said selective isolation switching element is set to prevent current flow between said first voltage supply node and said motor supply node, said first bridge circuit is configured to allow the spindle motor to supply current to said motor supply node, said boost circuit is activated to allow current to flow from said first voltage supply node to said motor supply node, and said second bridge circuit is configured to energize the head motor with current flowing from said first voltage supply node and current supplied by the spindle motor.

16. The circuit of claim 15 wherein said control circuit is further configured to sense a condition where the spindle motor speed falls outside a desired range, and in so sensing, prevent the regenerative state from being entered.

17. The circuit of claim 15 wherein said control circuit enters at least one of said regenerative braking states for a seek operation to be performed by the disk drive.

18. The circuit of claim 15 wherein:

said spindle motor is a multi-phase motor having a plurality of commutation states;

said set of regenerative braking states includes regenerative braking states for at least some of said commutation states; and said control logic is configured to generate control signals for operation in respective regenerative braking states for each of a contiguous sequence of commutation states.

19. The circuit of claim 15 wherein:

said spindle motor is a multi-phase motor having a plurality of commutation states;

said set of regenerative braking states includes regenerative braking states for at least some of said commutation states; and said control logic is configured to generate control signals for operation in respective regenerative braking states for each of a non-contiguous sequence of commutation states.

20. The circuit of claim 15 wherein said boost circuit is a synchronous boost converter comprising an inductor and at least one switching element.

21. A chip set for use in a disk drive having a spindle motor and a head motor, the spindle motor having a set of motor windings to which electric power is applied to rotate the spindle motor, the chip set comprising:
- a plurality of switching elements incorporated in one or more semiconductor devices; and
- an integrated circuit device having drive control circuitry, wherein, during normal operation, control logic controls said plurality of switching elements to provide electrical power to the spindle motor windings and the head motor from a voltage source coupled to first and second voltage supply nodes;
- said control logic being configured to enter a regenerative braking state during normal operation, wherein:
  - at least one of said switching elements is controlled to isolate the spindle motor from the first voltage supply node;
  - at least some of said switching elements are controlled to cause regenerative braking of the spindle motor so that kinetic energy due to rotation of the spindle motor is converted to electrical power that is supplied to the head motor by virtue of inductance of one or more motor windings in the set; and
  - said control logic enters the regenerative braking state with the spindle motor isolated from the first voltage supply node for at least a portion of at least one seek operation to be performed by the disk drive.

22. A chip set for use in a disk drive having a spindle motor and a head motor, the spindle motor having a set of motor windings to which electric power is applied to rotate the spindle motor, the chip set comprising:
- a plurality of switching elements incorporated in one or more semiconductor devices; and
- an integrated circuit device having drive control circuitry, wherein, during normal operation, control logic controls said plurality of switching elements to provide electrical power to the spindle motor windings and the head motor from a voltage source coupled to first and second voltage supply nodes, wherein:
- said control logic is configured to enter a regenerative braking state during normal operation, with
  - at least one of said switching elements being controlled to isolate the spindle motor from the first voltage supply node, and
  - at least some of said switching elements being controlled to cause regenerative braking of the spindle motor so that kinetic energy due to rotation of the spindle motor is converted to electrical power that is supplied to the head motor by virtue of inductance of one or more motor windings in the set; and
- said control logic is further configured to sense a condition where the spindle motor speed falls outside a desired range, and in so sensing, prevent the regenerative state from being entered.

23. The chip set of claim 21 wherein said plurality of switching elements are incorporated in a single semiconductor chip.

24. The chip set of claim 21 wherein said plurality of switching elements are incorporated in more than one semiconductor chip.

25. A disk drive comprising:
- a disk having concentric tracks for storing information;
- a head for reading and/or writing information to said disk;
- a spindle motor having a set of windings for rotating said disk in response to current supplied to said windings;
- a head motor for moving said head to access selected tracks on said disk;
- a spindle motor drive circuit;
- a head motor drive circuit;
- first and second voltage supply nodes for connection to a source of electrical power for said spindle motor and said head motor;
- a selective isolation switching element, coupled between said first supply node and an intermediate motor supply node, said spindle motor drive circuit and said head motor drive circuit being coupled between said motor supply node and said second supply node;
- motor control logic coupled to said spindle motor drive circuit, said head motor drive circuit, and said selective isolation switching element, said control logic being configured to enter a regenerative braking state during normal operation wherein
  - said selective switching element is controlled to isolate said spindle motor from said first voltage supply node;
  - said spindle motor drive circuit and said head motor drive circuit are controlled to cause regenerative braking of the spindle motor so that kinetic energy due to rotation of the spindle motor is converted to electrical power that is supplied to the head motor; and
  - said control logic enters the regenerative braking state with the spindle motor isolated from the first voltage supply node for at least a portion of at least one seek operation to be performed by the disk drive.

* * * * *